US009576708B2

(12) United States Patent
Graham (10) Patent No.: US 9,576,708 B2
(45) Date of Patent: Feb. 21, 2017

(54) APPARATUS FOR REPLACING INSULATORS ON ENERGIZED POWER LINES

(71) Applicant: Haverfield International Incorporated, Gettysburg, PA (US)

(72) Inventor: Larry Graham, Hollsopple, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 371 days.

(21) Appl. No.: 14/243,022

(22) Filed: Apr. 2, 2014

(65) Prior Publication Data

US 2014/0259649 A1  Sep. 18, 2014

Related U.S. Application Data

(62) Division of application No. 13/329,569, filed on Dec. 19, 2011, now Pat. No. 8,782,885.

(51) Int. Cl.
*B23P 19/00* (2006.01)
*H01B 19/00* (2006.01)

(52) U.S. Cl.
CPC ............ *H01B 19/00* (2013.01); *Y10T 29/4984* (2015.01); *Y10T 29/49192* (2015.01); *Y10T 29/49227* (2015.01); *Y10T 29/49815* (2015.01); *Y10T 29/49826* (2015.01); *Y10T 29/49904* (2015.01); *Y10T 29/51* (2015.01); *Y10T 29/53283* (2015.01)

(58) Field of Classification Search
CPC ..................................................... H01B 19/00
USPC .............. 29/426.1, 428, 434, 469, 721, 729, 742,29/592.1, 602.1, 605, 606, 82, 7, 867, 887
See application file for complete search history.

(56) References Cited

U.S. PATENT DOCUMENTS

| 1,394,020 | A | | 10/1921 | Johnson, Jr. |
| 3,402,786 | A | | 9/1968 | White et al. |
| 3,898,372 | A | | 8/1975 | Kalb |
| 4,189,828 | A | | 2/1980 | Chadwick, Jr. |
| 4,198,538 | A | | 4/1980 | Lusk |
| 4,760,640 | A | * | 8/1988 | Lawrence ............... B25B 27/14 174/150 |

(Continued)

FOREIGN PATENT DOCUMENTS

JP          08036929 B1    2/1996
WO       2008000677 A1    1/2008

OTHER PUBLICATIONS

Hastings, Productivity with Safety on Hotline Work, 1985, pp. S-1 through S-3.

*Primary Examiner* — Paul D Kim
(74) *Attorney, Agent, or Firm* — Stuart J. Friedman (57) ABSTRACT

Apparatus for replacing a suspension insulator on a tower having a davit arm supporting an attached insulator and a conductor shoe attaching an energized conductor to the insulator lower end including a non-conductive board longer than and mounted to the tower below the davit arm, struts extending between the board and the tower, and a movable slider mounted on the board, the slider supporting a jack and a conductor lifting bar attached to the jack. Without contacting any energized components, a lineman moves the slider and operates the jack to lift and support the energized components, detaches the shoe from the insulator, moves the energized components to a remote position on the board, detaches and replaces the insulator while it is supported by a helicopter, moves the slider and operates the jack to lift the shoe into alignment with the insulator and attaches the shoe to the insulator.

29 Claims, 8 Drawing Sheets

(56) References Cited

U.S. PATENT DOCUMENTS

| | | |
|---|---|---|
| 5,235,861 A | 8/1993 | Seppa |
| 5,559,430 A | 9/1996 | Seppa |
| 8,051,544 B2* | 11/2011 | Graham .................. H02G 1/02 29/402.03 |
| 8,662,550 B2* | 3/2014 | Graham .................. H02G 1/02 294/67.1 |

* cited by examiner

APPARATUS FOR REPLACING INSULATORS ON ENERGIZED POWER LINES

This is a division of application Ser. No. 13/329,569 filed Dec. 19, 2011, now U.S. Pat. No. 8,782,885.

FIELD OF THE INVENTION

The present invention relates to a method and apparatus for replacing insulators on energized power lines supported by a tower and, more particularly, to a method and apparatus which is particularly suitable for use on a tower having insulator and conductor supporting davit arms which are narrow and lightweight and, therefore, unsuitable for supporting a lineman or heavy equipment.

BACKGROUND OF THE INVENTION

High voltage power transmission lines carrying voltages in the hundreds of kilowatt range have been constructed to extend from spaced towers, poles or other vertical supports (hereinafter collectively referred to as "towers") in terrain which is often practically inaccessible to land vehicles. In recent years, a number of methods and devices have been developed to facilitate the repair and maintenance of high voltage power transmission lines which are accessed by helicopter.

Towers having davit arms are frequently employed for supporting multiple high voltage electrical conductors. The conductors are typically supported under the arms of such towers using a suspension insulator for each conductor. Periodically, it is necessary to replace the insulators because they are visibly damaged, as part of a general maintenance plan or for some other reason. Typically, an insulator is attached via a pin to each davit arm and via a pin to a shoe which supports the conductor. These pins, typically, must be manually removed by linemen placed on the tower via helicopter in order to replace the insulators. Pin removal typically requires either bare-handed contact with energized components or shut down of electrical flow in the conductor. Damaged or worn insulators are typically removed from the tower via helicopter and replacement insulators are delivered to the tower via helicopter. However, when the davit arms are narrow and lightweight, they cannot safely support a lineman and the equipment necessary for removing and replacing insulators. Therefore, the conventional manner of removing and replacing insulators, where the lineman and his equipment are supported on and work from the tower arm, cannot be used. This presents a particular problem for safely accessing and replacing the insulators on each davit arm.

Accordingly, there exists a need for a method and apparatus for safely accessing the insulator, energized conductor and their hardware, disconnecting the energized conductor from the insulator, disconnecting the insulator to be replaced from the davit arm and obtaining and connecting a replacement insulator, all without utilizing the davit arm to support the lineman and without exposing the lineman to the risk of contacting the grounded tower while handling the energized conductor.

SUMMARY OF THE INVENTION

It is, therefore, a primary object of the present invention to provide novel and improved lineman support apparatus and energized conductor handling apparatus which is deployed and removed from the tower by helicopter and which can be used on a tower having insulator and conductor-supporting davit arms which cannot safely support a lineman and the equipment necessary for removing and replacing energized conductor-supporting suspension insulators.

It is also an object of the present invention to provide a novel and improved method for replacing insulators on energized power lines which is particularly suitable for use on a tower having insulator and conductor supporting davit arms which are narrow and lightweight and, therefore, unsuitable for supporting a lineman or heavy equipment.

It is another object of the present invention to provide a novel and improved method for replacing insulators on energized power lines according to which a lineman can replace a suspension insulator without making bare-handed contact with any energized components and without need for shutting down electrical flow through the conductors.

It is yet another object of the present invention to provide a novel and improved lineman support apparatus and energized conductor handling apparatus which will allow a lineman to replace a suspension insulator without making bare-handed contact with any energized components and without need for shutting down electrical flow through the conductors.

It is still another object of the present invention to provide a novel and improved method for replacing insulators, insulator support hardware and conductor shoes on energized power lines which is particularly suitable for use on a tower having insulator and conductor supporting davit arms which are narrow and lightweight and, therefore, unsuitable for supporting a lineman or heavy equipment.

The foregoing and other objects are achieved in accordance with the present invention in a method for replacing an electrical suspension insulator on a tower having insulator-supporting, and high voltage energized electrical conductor-supporting, davit arms using a helicopter and at least one lineman, said insulators being supported by insulator support plates attached to said davit arms and said conductors being supported in conductor shoes attached to the lower ends of said suspension insulators, comprising the steps of:

mounting an elongate, non-conductive board having inner and outer ends to said tower with said inner end adjacent said tower, said board being mounted sufficiently below the davit arm supporting the insulator to be replaced to allow a lineman standing on said board to reach said davit arm, said board including upstanding elongate side panels for defining therebetween and with the upper surface of said board a generally U-shaped track, said board having a length at least one foot longer than said davit arm;

mounting elongate, non-conductive, length-adjustable strut means having inner and outer ends to said tower with said inner ends of said strut means adjacent said tower and the outer ends of said strut means attached near the outer end of said board, said strut means being mounted sufficiently below the board for providing diagonal bracing support therefor;

operating said length-adjustable strut means for positioning said board horizontally and for maintaining said board horizontally positioned on said tower;

supporting an elongate, non-conductive slider in said track for movement between inner and outer ends of said board, said slider including a planar surface parallel to said upper surface of said board and slider or roller means for facilitating movement of said slider along said track, the upper side of said planar surface including jack means rigidly mounted thereon, said jack means including a piston means vertically reciprocally movable therewithin, and conductor lifting means rigidly connected to said piston means for engaging said conductor;

using a non-conductive stick,
  pushing said slider along said board until said jack means and said conductor lifting means are positioned directly underneath the conductor shoe and said conductor lifting means is oriented to engage said conductor;
  operating said jack means to raise said conductor lifting means until it engages with and lifts said conductor and said conductor shoe, whereby said conductor and conductor shoe is supported only by said jack means and not by said suspension insulator;
  detaching the suspension insulator from the conductor shoe and operating said jack means to lower said-conductor lifting means for separating said insulator from said conductor and conductor shoe;
  pushing said slider toward the outer end of the board and away from said insulator a sufficient distance to allow a lineman access to said suspension insulator without contacting the energized conductor or conductor shoe;
attaching said suspension insulator to a hovering helicopter, detaching the suspension insulator from said insulator support plate and removing the suspension insulator from said tower via helicopter;
delivering a replacement insulator via helicopter to said tower, attaching said replacement insulator to said insulator support plate and detaching said replacement insulator from said helicopter;
using a non-conductive stick,
  moving said slider along the board from the outer end of the board until the conductor lifting means, which is supporting the conductor and conductor shoe, is positioned directly underneath the lower end of the replacement insulator;
  operating said jack means to raise conductor lifting means until the conductor shoe is aligned with the lower end of said replacement insulator; and
  attaching the conductor shoe to the lower end of said replacement insulator, operating said jack means to lower conductor lifting means for separating it from said conductor and conductor shoe and moving said slider along said board away from said insulator and energized conductor.

In another aspect of the present invention, the method includes the steps of: positioning a lineman on the outer end of said board after said slider supporting said conductor and conductor shoe is pushed to the outer end of said board, said lineman equalizing his electrical potential with that of said conductor and replacing the conductor shoe before the conductor and conductor shoe are attached to said replacement insulator.

In still another aspect of the present invention, there is provided apparatus for replacing an electrical suspension insulator on a tower having insulator-supporting and high voltage energized electrical conductor-supporting davit arms wherein said suspension insulators are supported by said davit arms and said conductors are supported in conductor shoes attached to the lower ends of said suspension insulators, said apparatus comprising:
  an elongate, non-conductive board having a planar upper surface and inner and outer ends, said inner end including means for mounting said board to said tower, said board including elongate side panels projecting above said planar surface for defining between said side panels said upper surface of said board a generally U-shaped track, said board having a length at least one foot longer than the davit arm supporting the insulator to be replaced;
  elongate, non-conductive, length-adjustable strut means having inner and outer ends, said inner end including means for mounting said strut means to said tower with said outer ends of said strut means attached near the outer end of said board, said strut means adapted to be mounted to said tower below said board for providing diagonal bracing support therefor; and
  an elongate, non-conductive slider mounted in said track for movement between inner and outer ends of said board, said slider including a planar surface parallel to said upper surface of said board and slider or roller means between said board upper surface and said slider planar surface for facilitating movement of said slider along said track, the upper side of said planar surface including jack means rigidly mounted thereon, said jack means including a piston means vertically reciprocally movable therewithin, and conductor lifting means rigidly connected to said piston means for engaging said conductor.

DETAILED DESCRIPTION OF THE INVENTION

Figure 1:
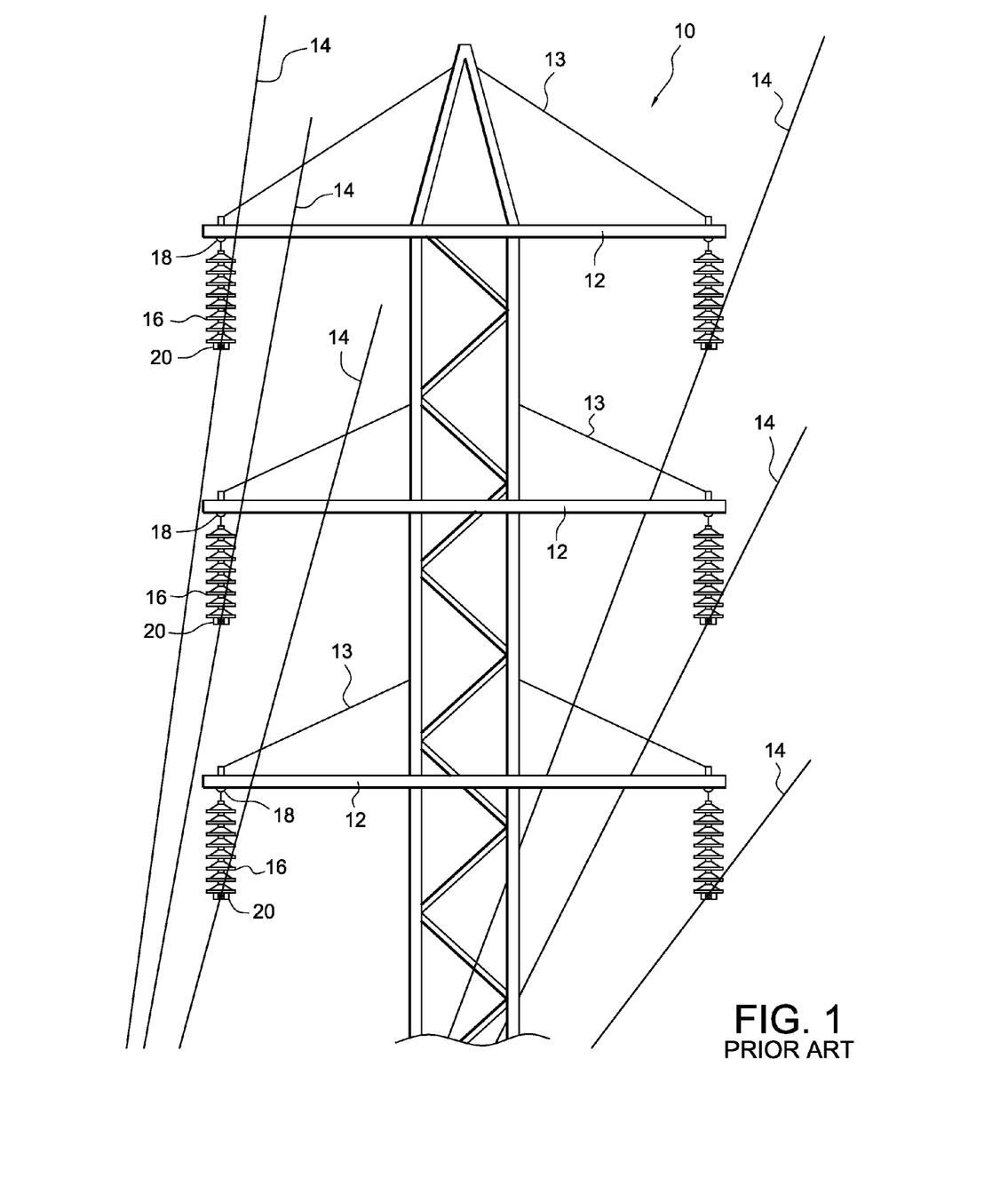
FIG. 1 is a front elevational view of a typical tower having narrow and lightweight davit arms for supporting high voltage power transmission lines via suspension insulators.

Referring to FIG. 1 there is shown a more or less typical steel lattice tower 10 for supporting multiple high voltage conductors. The lattice tower 10 includes several (three are shown in FIG. 1) vertically spaced apart conductor-supporting davit arms 12 extending from at least one side (FIG. 1 shows davit arms extending from two sides) of tower 10. Frequently, the davit arms are narrow and lightweight and have upper diagonal supports 13 between the end of the arms 12 and the tower 10. Sometimes tower 10 is supported by guide wires or cables (not shown) attached to the ground. Each conductor 14 is supported by a suspension insulator 16 depending from each of the davit arms 12. Typically, an insulator support plate 18 attached to the davit arms 12 supports the insulators 16 and the insulators are connected via pins to the insulator support plate 18. Likewise, a conductor shoe 20 supports the conductor 14 and the bottom of each suspension insulator 16 is connected via pins to the conductor shoe 20. It will be appreciated that conductor 14 is relatively heavy and its weight places the suspension insulator 16 in tension, making it very difficult to pull the conductor shoe pins and the insulator support plate pins in order to remove and replace the insulator. Generally, when replacing a suspension insulator 16, the conductor 14 to which it is attached must be supported in some manner other than by the suspension insulator 16 in order to create slack in suspension insulator 16 to allow unpinning of the conductor shoe 20 from suspension insulator 16 and unpinning and removal of suspension insulator 16 from insulator support plate 18 of davit arm 12.

It will be appreciated that due to their structure, the davit arms are neither strong nor sturdy. Accordingly, it is not practical to place either a lineman or equipment on the davit arms 12 in an effort to use the arms as a base of operations to remove and replace the insulator suspended therefrom. Moreover, inasmuch as the conductor is energized during insulator removal and replacement and since the tower 10 is grounded, a lineman on the tower 10 must take care to avoid simultaneous contact with the tower 10 and any energized element, such as the conductor, conductor shoe, conductor shoe pins, and the like.

Accordingly, referring to FIGS. 2-6, the present invention provides a board 22, which is an elongate, lightweight, non-conductive fiberglass board, desirably having a downwardly opening, channel-like cross-section, comprising a pair of elongate flanges 24 depending from opposite longitudinal sides of the board web 25 for defining a generally inverted U-shaped cross-section. Board 22 is cantilevered from the tower 10 with its flat web 25 facing upwardly and its flanges 24 pointing toward the ground. Desirably, the upper surface of web 25 includes a non-slip surface. Erection of board 22 to tower 10 can be accomplished by mounting board 22 to tower 10 in any conventional manner using a bracket means 26 (see FIGS. 9 and 10) which is rigidly mounted to tower 10, e.g., using J-clamps 26, chain tighteners, nylon straps or other means. Usefully, board 22 is mounted at a point about 6' below the davit arm 12 supporting the insulator 16 to be removed and replaced. A pair of adjustable length support struts 28 are diagonally positioned between board 22 and tower 10 with one end 28a of the struts 28 mounted to the tower 10 at least 4 feet below the board 22 and the other end 28b pivotally mounted near the outboard end (as used herein the term "outboard" or "outer" end refers to the end remote from tower 10 and the term "inboard" or "inner" end refers to the end most closely adjacent tower 10) of the board 22 to provide diagonal bracing support for the board 22. Struts 28 can be mounted to tower 10 in any conventional manner using a bracket means 26' (see FIGS. 7 and 10) which is rigidly mounted to tower 10, e.g., using J-clamps, chain tighteners, nylon straps or other means. Typically, board 22 has a length from at least one foot (1') longer up to about eight feet (8') longer than the davit arm 12 from which the insulator 16 to be replaced is suspended. The length of board 22 depends in part upon the maintenance operations to be performed and, in part, upon the voltage in the energized conductor. For example, if the conductor shoe 20 will not be replaced, then a shorter board, as little as 1'-4' longer than davit arm 12 will suffice, as will be more fully discussed hereinafter. On the other hand, if the conductor shoe 20 is to be replaced, then a longer board is required, e.g., 6'-8' longer than the davit arm, as will be discussed more fully hereinafter. Board 22 desirably has a non-slip upper surface and has a minimum width of about 12".

Figure 2:
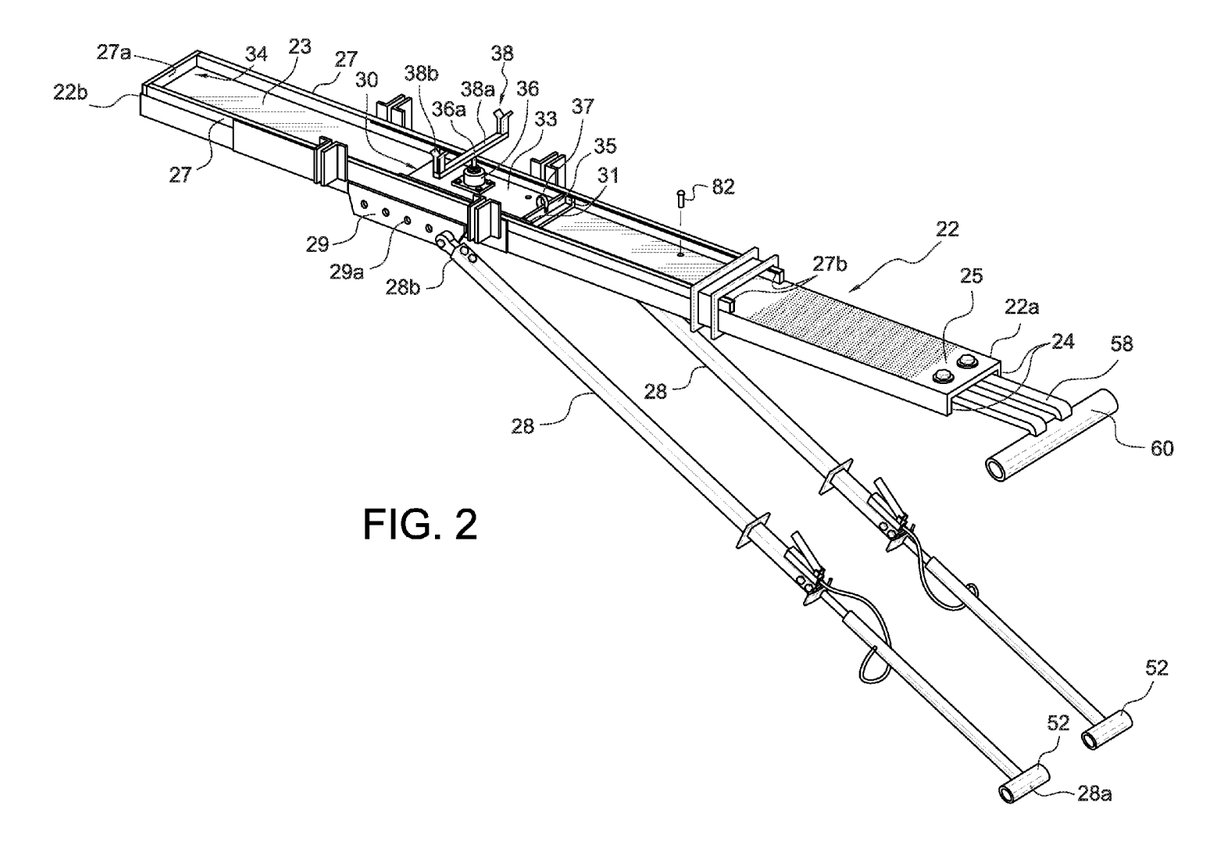
FIG. 2 is a perspective view of the lineman supporting and energized conductor handling apparatus of the present invention.
Figure 3:
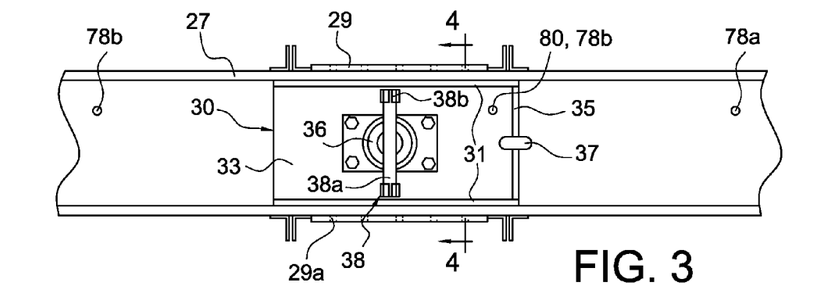
FIG. 3 is a partial top plan view of the lineman supporting and energized conductor handling apparatus of the present invention.
Figure 4:
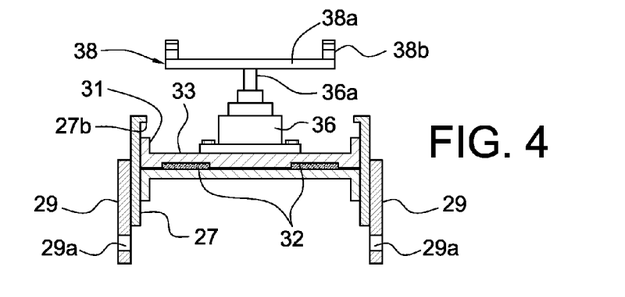
FIG. 4 is a sectional view taken along line A-A of FIG. 3.

To increase the strength of board 22 a pair of longitudinally extending elongate stiffener panels 27 are attached to opposite elongate flanges 24 from the outboard end 22b of board 22 and extending along the length of board 22. In addition, a transversely extending elongate stiffener panel 27a is attached to the ends of elongate flanges 24 at outboard end 22b and extends between the outboard ends of longitudinally extending stiffener panels 27. Stiffener panels 27 and 27a project above web 25 of board 22 at least a sufficient distance to define between them a track 23 in which a slider 30 can slide along web 25. Although stiffener panels 27 and 27a may be attached in any conventional manner, desirably they are adhesively secured to flanges 24. A second pair of elongate stiffener panels 29 extend longitudinally along and are attached to stiffener panels 27 from a location near the outboard end 22b of board 22, e.g., about 2-3 feet from its outboard end 22b, and extend about 2-3 feet toward the inboard or mounting end 22b of board 22. Stiffener panels 29 project below stiffener panels 27 and include a series of longitudinally spaced apart apertures 29a to which one end 28b of struts 28 can be pivotally mounted, as hereinbefore discussed. Like stiffener panels 27 and 27a, stiffener panels 29 may be attached in any conventional manner although, desirably, they are adhesively secured to stiffener panels 27.

Figures 5, 6:
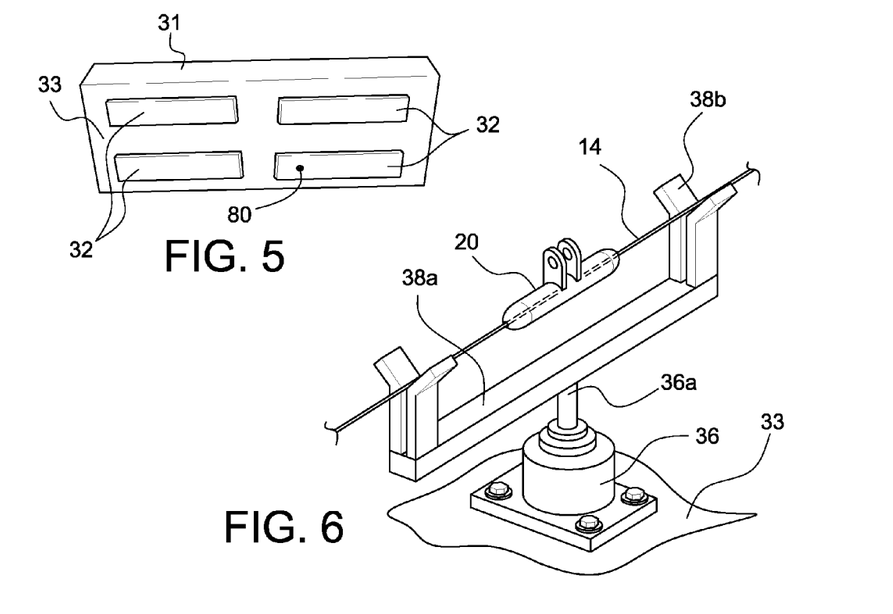
FIG. 5 is a bottom perspective view of an energized conductor slider forming a part of the lineman supporting and energized conductor handling apparatus of FIG. 2.
FIG. 6 is a perspective view of a conductor lifting and supporting assembly forming a part of the lineman supporting and energized conductor handling apparatus of FIG. 2.

An elongate slider 30, desirably having an upwardly opening, channel-like cross-section, comprises a pair of upstanding flanges 31 along opposite longitudinal sides of slider web 33 for defining a generally U-shaped cross-section. Slider 30 is dimensioned to rest upon and slide on web 25 of board 22 between longitudinally extending stiffener panels 27. Slider 30, desirably, has a length of 1-2 feet, is formed of non-conductive materials and includes slider panels 32 positioned on the underside of slider web 33 between the web 25 of the board 22 and the web 33 of slider 30 such that slider 30 is freely slidable along the length of board 22. It will be appreciated that while slider panels 32 may be formed of nylon, felt, teflon or other low friction materials, other forms of sliding or roller means can be utilized to allow slider 30 to easily move along the upper web surface 25 of board 22. For example, for use with very heavy conductors, small wheels (not shown) may be substituted for slider panels 32 to facilitate the sliding of the underside of web 33 along the upper surface of web 25. Stop means 34 are provided at the free end of the board 22 to prevent slider 30 from sliding off board 22. In the preferred form of the invention, as hereinabove described, the function of stop means 34 is performed by transverse stiffener 27a. However, any suitable stop means capable of preventing slider 30 from sliding off board 22 at free end 22b can be used. In addition, slider 30 is prevented from rising up off of web surface 25 by transversely extending flanges 27b projecting inwardly from stiffener panels 27. Desirably, slider 30 includes a transverse upstanding flange 35 extending between slider flanges 31 at the inboard end of slider 30 for mounting a lifting ring 37 thereon.

A hydraulic jack 36 is rigidly mounted, as by bolts, upon web 33 of slider 30 and a conductor lifting bar 38 is desirably welded to the upper end of piston 36a of jack 36. Preferably, conductor lifting bar 38 comprises an elongate bar 38a having at each end a pair of opposed upwardly extending fingers 38b, the fingers of each pair being spaced apart in a direction perpendicular to the longitudinal extent of bar 38a, and the upper ends of each of the fingers 38b being flared outwardly away from the other finger 38b of the pair. In this manner the flared upper ends of fingers 38b can receive and support conductor 14 with conductor shoe 20 positioned between the two pairs of fingers 38b and spaced above elongate bar 38a. As will become apparent from the discussion which follows, the slider 30 can be slid along board 22 to position jack 36 directly underneath conductor shoe 20 and conductor lifting bar 38 can be rotated (together with piston 36a) to align the two pairs of fingers 38a with conductor 14. Hydraulic jack 36 can then be operated to lift conductor lifting bar 38 until fingers 38b engage conductor 14 and the weight of conductor 14 and conductor shoe 20 is supported by jack 36, and not by suspension insulator 16.

Figures 7, 8, 9, 10:
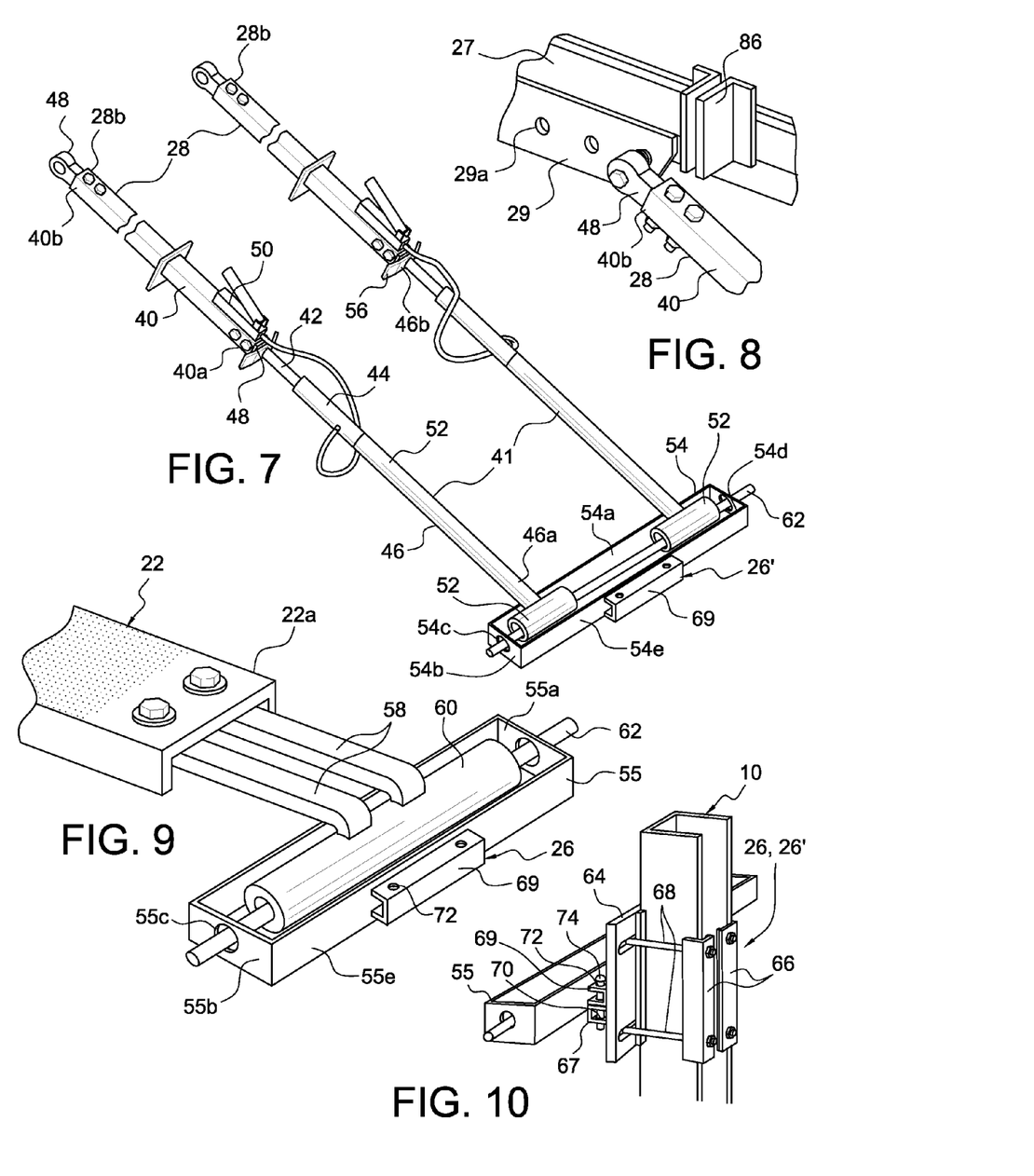
FIG. 7 is a perspective view of the inboard end of board support struts showing the manner in which they are pivotally mounted to a tower.
FIG. 8 is a perspective view of the pivotal connection between the outboard end of the support struts and the lineman support board.
FIG. 9 is a perspective view of the inboard end of a lineman support board showing the manner in which it is pivotally mounted to a tower.
FIG. 10 is a perspective view of an illustrative davit arm supporting tower bracket including a mounting tray for receiving the inboard end of either the lineman support board or the support struts.

Referring to FIGS. 7 and 8, support struts 28 comprise elongate tubular support members 40, desirably of rectangular cross-section and formed of non-conductive materials, such as fiberglass, and length-adjustable strut extenders 41 for lengthening or shortening struts 28. The outboard end 40b of each support member 40 is pivotally attached, e.g., via a bolt, to one of the apertures 29a in stiffener 29 on each side of board 22. The inboard end 40a of each support member 40 engages adjustable strut extenders 41. In a preferred form of the invention, adjustable strut extenders 41 comprise a piston 42 reciprocally operable within a hydraulic cylinder 44, which form the outboard end portion 46b of elongate rams 46 which mount struts 28 to bracket means 26' rigidly affixed on tower 10. Desirably, solid metal bar inserts 48 having a matching cross-section to the cross-section of tubular support members 40 project into, and extend outwardly from, the hollow ends 40a,b of each tubular support member 40 and are attached to tubular support members 40 to provide strong and durable end attachments therefor. The portion of each insert 48 within the hollow end of each tubular support member 40 is preferably bolted to the support member 40 to maintain it rigidly in place, although other forms of attachment are also suitable. Desirably, the end of insert 48 projecting from inboard end 40a of support member 40 includes an adapter 56 attached thereto, preferably by welding, to facilitate its engagement with piston 42. A hydraulic pump 50 is connected to each hydraulic cylinder 44 via discharge and supply hoses for supplying non-conductive hydraulic fluid to each hydraulic cylinder 44 for lengthening or shortening each support strut 28 and, in turn, for raising, lowering and/or leveling board 22. Hydraulic pump 50 is desirably mounted on tubular support members 40 within reach of a lineman on tower 10 or on a ladder supported by tower 10 to facilitate its use during installation, removal and adjustment of board 22.

In a preferred embodiment of the invention, the inboard end portion 46a of each ram 46 terminates in a transversely extending cylindrical tubular segment 52 such that the tubular segments 52 at the inboard ends of rams 46 are transversely spaced apart. Tubular segments 52 and the ends of rams 46 are received within the open top 54a of an elongate mounting tray 54, which is mounted on strut bracket means 26'. Tray 54 is desirably rectangular in cross-section and enclosed on its other five surfaces, except that each end surface 54b includes an aperture 54c therein. A retaining rod 62 extends through the apertures 54c in mounting tray 54 and through tubular segments 52 to pivotally mount ends 28a of struts 28 to mounting tray 54 and, therefore, to board bracket means 26' in order to retain struts 28 pivotally affixed to tower 10. In the absence of rod 62, tubular segments 52 are forced against the lower, innermost corner 54d of tray 54 by the weight of board 22.

Referring to FIG. 9, board 22 is desirably pivotally mounted to tower 10 by a pair of transversely spaced apart elongate legs 58 extending toward tower 10 from inboard end 22a of board 22, the legs 58 terminating in a transversely extending tubular element, such as cylindrical tube 60. Legs 58 desirably extend from board mounting end 22b toward tower 10 outwardly and downwardly in a gentle arcuate curve. Tube 60 and the ends of legs 58 are received within the open top 55a of a second elongate mounting tray 55, which is mounted on board bracket means 26. Second tray 55 is desirably rectangular in cross-section and enclosed on its other five surfaces, except that each end surface 55b includes an aperture 55c therein. A retaining rod 62 extends through the apertures 55c in mounting tray 55 and through tube 60 to pivotally mount end 22a of the board 22 to mounting tray 55 and, therefore, to board bracket means 26 in order to retain board 22 pivotally affixed to tower 10.

Referring to FIG. 10, frequently the vertical support elements of tower 10 comprise vertical channels supporting horizontal davit arms, the channels opening inwardly of the tower and providing a flat web surface facing outwardly. Board 22 is usefully mounted to tower 10 at a location along tower 10 which is about six feet below the davit arm 12 supporting the insulator 16 to be removed and replaced. Struts 28 are usefully mounted to tower 10 at a location along tower 10 which is at least four feet below board 22. Both board 22 and struts 28 are mounted to tower 10 using bracket means 26, 26' which are rigidly affixed to tower 10 using any one of a number of conventional mounting means previously discussed. In a preferred embodiment of the invention, brackets 26, 26' comprise a metal plate 64 having one face flush with the web of the tower channel, clamps 66 extending from the rear of the tower channel around its side flanges and bolts 68 securing the metal plate 64 to the clamps 66. Metal plate 64 includes an apertures-containing flange 67 projecting from its surface away from tower 10. The tower facing surface 54e, 55e of receiving tray 54, 55 includes an apertures-containing flange 69 projecting rearwardly toward metal plate 64. Receiving tray 54, 55 mounts to bracket means 26, 26' by sliding flanges 67 and 69 along each other until apertures 70 of flange 67 are in vertical registry with apertures 72 of flange 69 and pins 74 are inserted through the aligned apertures to mount receiving tray 54, 55 to metal plate 64. Similarly configured bracket means can be used in circumstances where the vertical support element of the tower presents a corner instead of a flat web surface for mounting the board and struts thereto. In such a case, two web plates (not shown) extend rearwardly from the rear surface of metal plate 64 for defining an angle therebetween corresponding to the angle defined by the tower corner and metal plate 64 is mounted to the vertical tower element with the web plates adjacent each side of the tower element defining the corner. Clamps 66 engage the rear corners of the tower structure and bolts 68 secure the metal plate 64 to the clamps 66.

Figure 11:
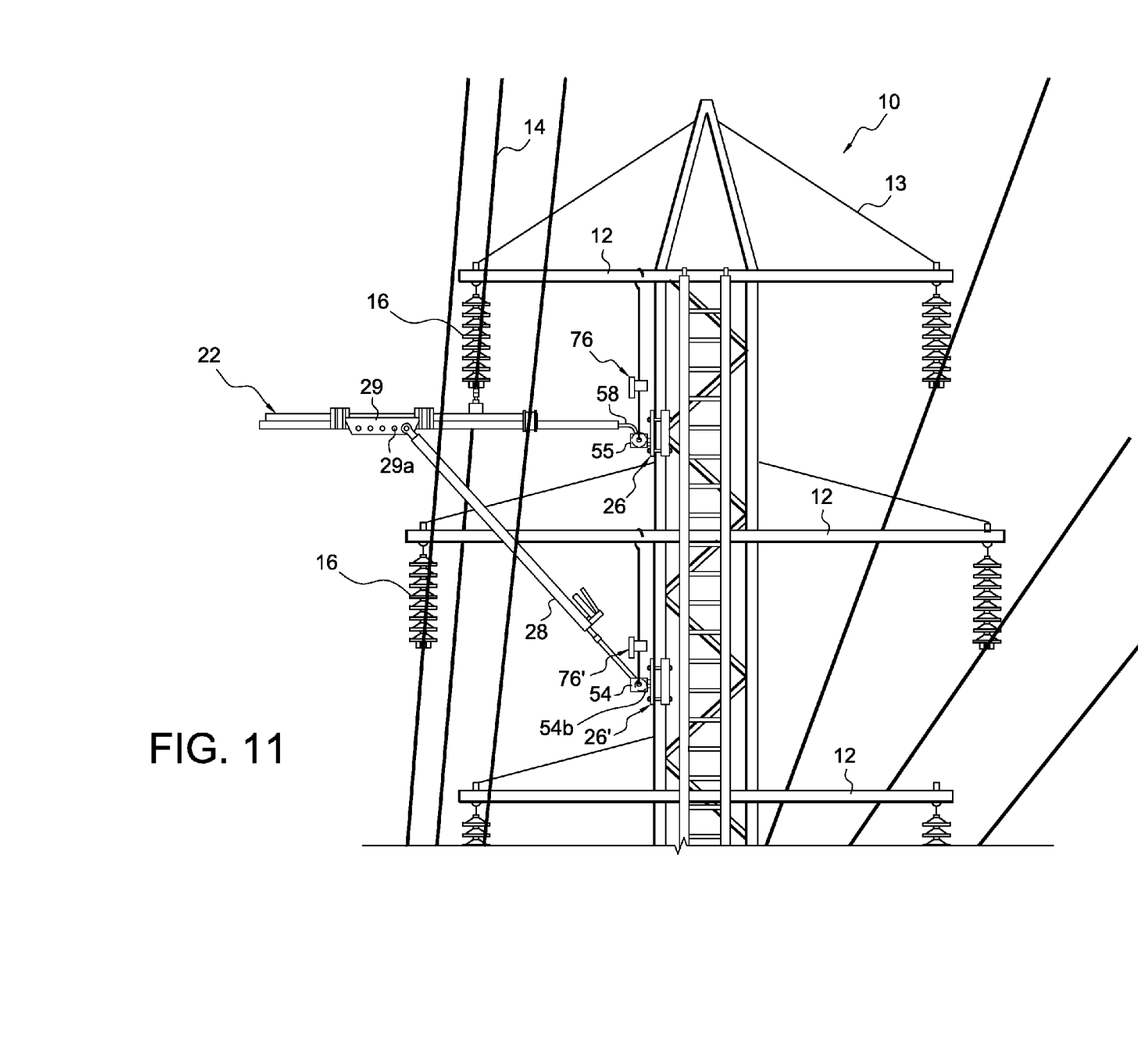
FIG. 11 is a perspective view of the lineman supporting and energized conductor handling apparatus of FIG. 2 mounted to a tower before work has begun to replace the insulator or hardware.

Referring to FIG. 11, to remove and replace a suspension insulator 16 when the conductor 14 is energized, initially, linemen, ladders and tools are flown to tower 10 via helicopter. Thereafter, bracket means 26, 26' and chain hoists 76 are flown out to tower 10. The first step is to rigidly affix bracket means 26, 26' such as are described herein, to a vertical support of tower 10. A first bracket means 26 is positioned about six feet below the davit arm 12, which supports the insulator 16 to be removed and replaced, for mounting board 22 to tower 10. A second bracket means 26' is positioned at least four feet below the first bracket means 26 for mounting the inboard ends 28a of the diagonal support struts 28. For safety purposes, it is desirable to attach a first ratchet chain hoist 76 to the davit arm 12 which is supporting the insulator 16 to be removed and replaced with the first chain hoist 76 supporting upper bracket means 26 and to attach a second ratchet chain hoist 76' to the next lower davit arm 12 (which is typically above the lower bracket means 26') or to tower 10 above the lower bracket means 26' with the second chain hoist 76' supporting lower bracket means 26'. Next, the board 22, with support struts 28 on opposite longitudinal sides of board 22 pivotally mounted near one end 28b to one of apertures 29a in stiffener panels 29 and with hydraulic pumps 50 attached to struts 28, is lifted by a helicopter to be mounted on the pair of vertically spaced apart bracket means 26, 26' which are already in place on tower 10.

At least when there is a davit arm 12 immediately below the davit arm supporting the insulator 16 to be replaced, the free end of one of struts 28 is initially tied to board 22 to keep it out of the way as the helicopter positions board 22 for mounting within mounting tray 55 on bracket means 26. This is important since board 22 is to be mounted under davit arm 12 with support struts 28 extending diagonally downwardly towards tower 10 on opposite sides of the next lower davit arm 12. Thus, if the board 22 were to be lifted and emplaced by a helicopter with struts 28 extending on opposite sides of davit arm 12, the next lower davit arm 12 would interfere with at least one of the struts 28 as the board 22 approaches tower 10. With one strut 28 tied up to the board 22, the helicopter can approach the tower 10 and davit arm 12 from the side of the depending strut 28 without the other strut 28 striking the next lower davit arm 12. The helicopter positions the board 22 relative to tower 10 until elongate legs 58 with attached transversely extending tubular cylinder 60 projects into the upper mounting tray 55. At this stage, the tied-up strut 28 is untied from board 22 and permitted to pivot downwardly about the bolt attaching it to aperture 29c in stiffener 29. The free end of board 22 is then lowered until the inboard ends 28a of both depending struts 28 and attached tubular end segments 52 are received within the lower mounting tray 54. The weight of the board forces tubular segments 52 into the lower innermost corner 54b of lower mounting tray 54. Retaining rod 62 is then inserted through the apertures 55c in upper mounting tray 55 and through cylindrical tube 60 to pivotally mount and retain inboard end 22a of board 22 in upper mounting tray 55. The board is then leveled side to side and outboard to inboard by a lineman on tower 10 separately operating hydraulic pumps 50 on each of struts 28. Desirably, slider 30, with hydraulic jack 36 bolted to slider 30 and conductor lifting bar 38 welded to piston 36a of jack 36, is locked onto board 22 at a position near inboard end 22a of board 22 prior to board 22 being lifted to tower 10 by a helicopter. Board 22 has at least one aperture 78a in its inboard end portion and slider 30 includes an aperture 80 in web 25 which can be moved into registry with inboard board aperture 78a and a locking pin 82 inserted through apertures 78a and 80 to lock slider 30 in position near inboard end 22a of board 22 during movement of board 22.

Figure 12:
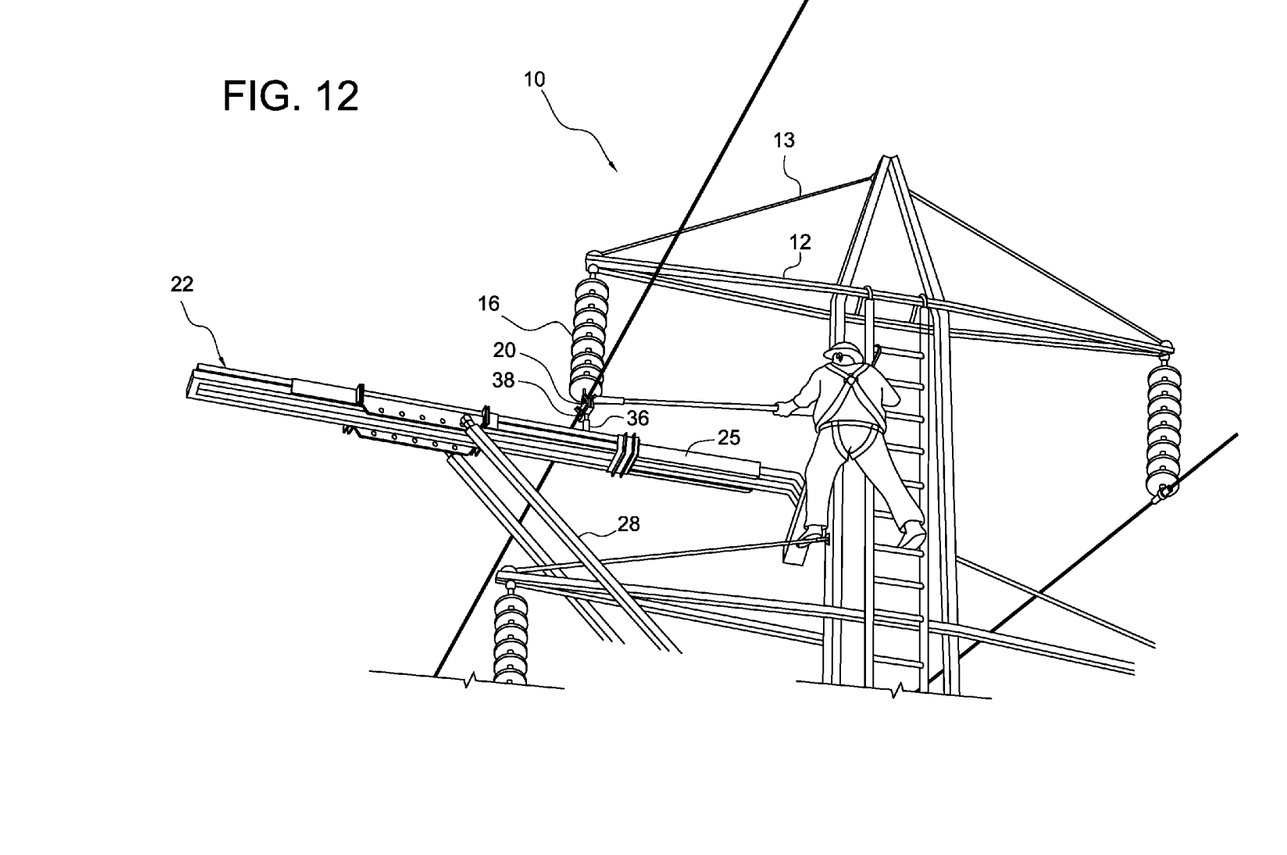
FIG. 12 is a perspective view of the apparatus of FIG. 2 mounted to a tower showing a lineman removing the conductor shoe pins which attach the conductor and conductor shoe to the suspension insulator.

Using a non-conductive shotgun stick, a lineman stands on either tower 10 or board 22 near tower 10 and pushes slider 30 along board 22 until jack 36 and conductor lifting bar 38 are positioned directly underneath the conductor shoe 20, which is pinned to the lower end of suspension insulator 16, with the fingers 38b of conductor lifting bar 38 beneath and aligned with conductor 14. Utilizing the shotgun stick, a lineman operates hydraulic jack 36 to raise conductor lifting bar 38 until fingers 38b engage and lift conductor 14 and conductor shoe 20. When this occurs, conductor 14 and conductor shoe 20 are supported only by hydraulic jack 36 and not by the suspension insulator 16, thereby creating slack in suspension insulator 16. Referring to FIG. 12, still using a non-conductive shotgun stick, a lineman removes the cotter pin and load pin attaching the suspension insulator 18 to the conductor shoe 20. Hydraulic jack 36 is then reversed by a lineman with the non-conductive shotgun stick and operated to lower conductor lifting bar 38 in order to separate suspension insulator 16 from the conductor 14 and conductor shoe 20, which are now supported by conductor lifting bar 38. The hydraulic jack 36 is then locked.

Figure 13:
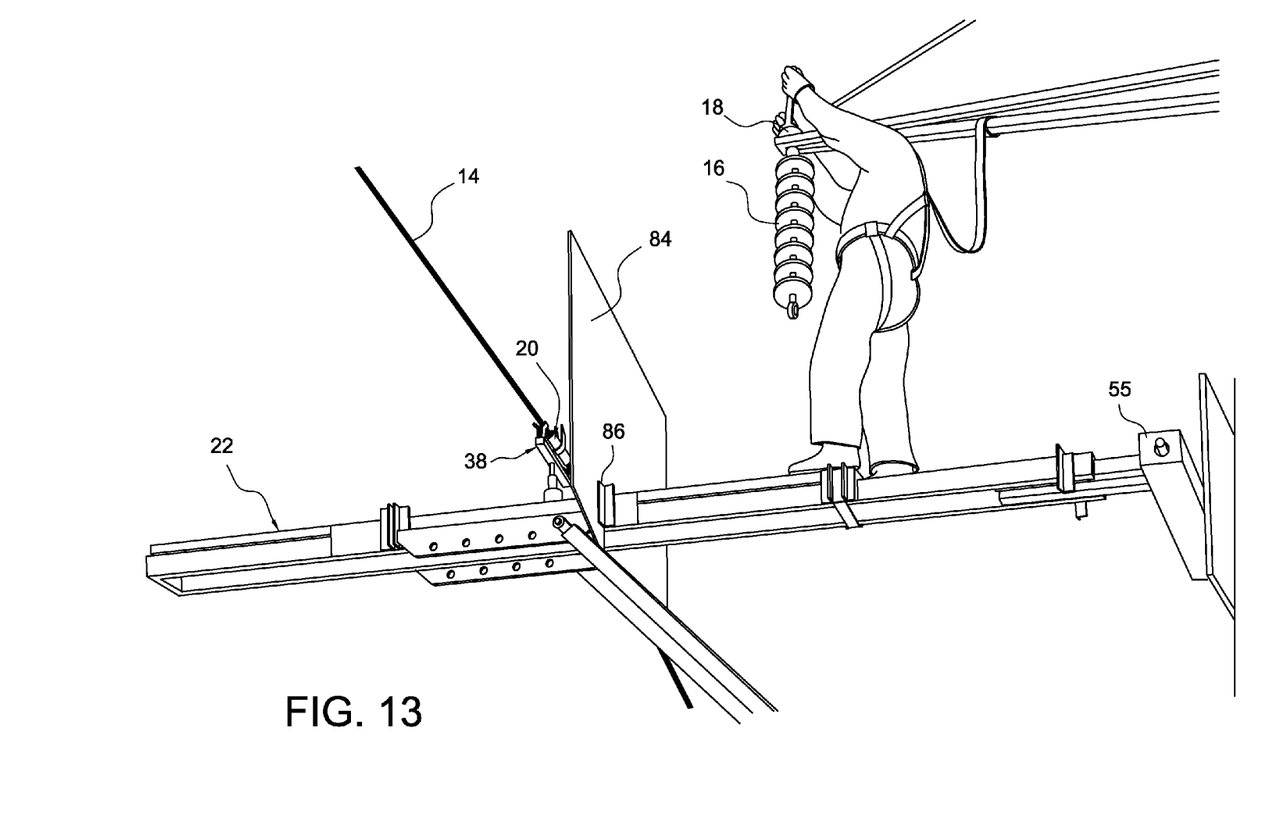
FIG. 13 is a perspective view of the apparatus of FIG. 2 mounted to a tower showing the energized conductor and conductor shoe detached from the insulator and supported by the conductor handling apparatus, which has been positioned near the outboard end of the lineman support board and spaced from the lineman by a safety arc shield.

Referring to FIG. 13, using the shotgun stick, a lineman pushes slider 30, supporting the conductor 16 and conductor shoe 20, toward the outboard end of board 22 and away from insulator string 16 to allow a lineman access to the insulator string 16 without contacting or substantial risk of contacting the energized conductor 14 or conductor shoe 20. Board 22 has at least one aperture 78b in its outboard end portion and slider 30 includes an aperture 80 in web 25 which moves into registry with outboard board aperture 78b as the slider 30 slides along board 22. Using the shotgun stick a lineman inserts a locking pin 82 through the slider web aperture 80 into outboard board aperture 78b to lock slider 30 in position remote from the insulator string 16. Outboard board aperture 78b is sufficiently far away from the insulator 16 so that a lineman can work on the insulator without contacting the energized conductor 14 or conductor shoe 20. Desirably, a lineman then installs a safety arc shield 84, which is an insulated partition, between insulator 16 and the energized conductor 14 and conductor shoe 20 and isolates these energized elements by inserting the lower margin of shield 84 into vertically oriented guides 86 extending upwardly from stiffener panels 29. At this point a lineman walks out along board 22 to the suspension insulator 16, attaches the insulator 16 to a line from a nearby hovering helicopter and pulls the pins attaching the insulator 16 to the insulator support plate 18. The helicopter flies away from tower 10, removing the worn or damaged insulator 16 from tower 10. If desired, the lineman then removes the old insulator support plate 18 and installs a new one in its place. The helicopter returns with a replacement insulator string 16, which the lineman pins to the insulator support plate 18 and then detaches the replacement insulator 16 from the helicopter.

Figure 14:
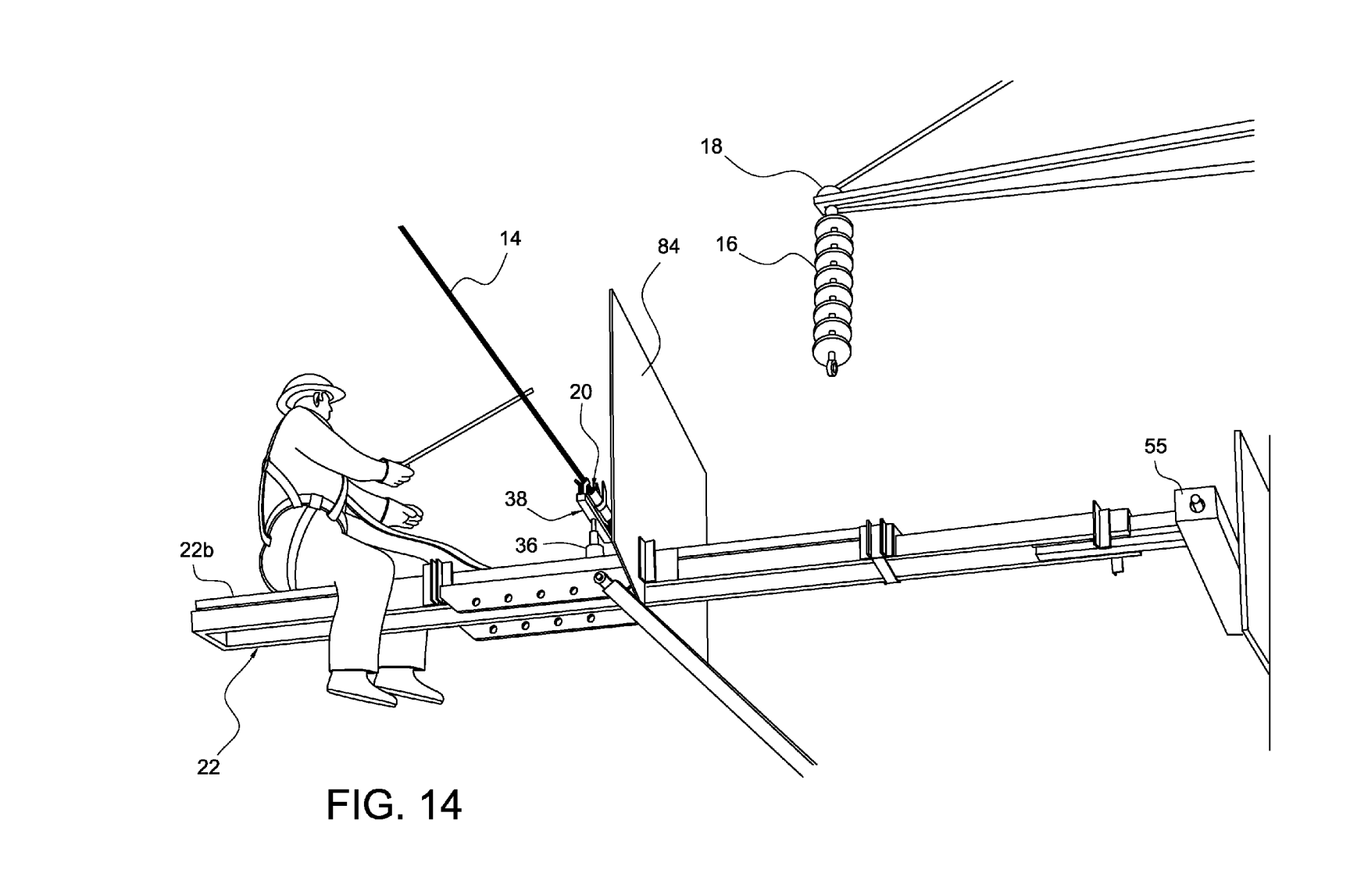
FIG. 14 is a perspective view as in FIG. 13 after the insulator has been removed and replaced and a lineman transported to and emplaced on the outboard end of the lineman support board prior to replacing the insulator shoe.

Referring to FIG. 14, after the replacement insulator 16 has been installed or, in some circumstances, when it is being installed by a lineman, if it is desired to replace the conductor shoe 20, a lineman is transported by helicopter to a location on the outboard end 22*b* of board 22 where the energized conductor 14 and conductor shoe 20 are positioned such that conductor 14 and conductor shoe 20 are located between the lineman and the arc shield 84. When it is desired to replace conductor shoe 20, board 22 must be sufficiently long to accommodate the lineman on its outboard end 22*b*. In such a case, board 22 should be at least 6'-8' longer than davit arm 12, depending upon the voltage in the energized conductor. It will be appreciated that, if conductor shoe 20 is not to be replaced, there would be no need to position a lineman on the outboard end 22*b* of board 22, in which case board 22 need only be about 1'-4' longer than the davit arm, depending upon the voltage in the energized conductor. Two linemen may safely be supported on board 22 at the same time only when conductor 14 is small in diameter, e.g., 1" or less, and lightweight. If conductor 14 is relatively large in diameter, e.g., more than 1", and heavy or where tower 10 is on inclined ground, such as a steep hill, only one lineman at a time is permitted on board 22. Using an insulated hot stick and a conductive clamp, the lineman on the outboard end 22*b* of board 22 equalizes the electrical potential between himself and the energized conductor 14 in a well known manner, removes the old conductor shoe 20 and installs a new one in its place. Thereafter, the lineman is removed by helicopter from the outboard end 22*b* of board 22.

A lineman is next positioned on board 22 between the tower 10 and arc shield 84. The lineman removes safety arc shield 84 from guides 86 and, using a non-conductive shotgun stick, pulls slider 30 along board 22 until jack 36 and conductor lifting bar 38, supporting conductor 14 and conductor shoe 20, are positioned directly underneath the lower end of replacement suspension insulator 16. Utilizing a shotgun stick, a lineman operates hydraulic jack 36 to lift conductor lifting bar 38 until the conductor shoe 20 is aligned with the lower end of the insulator string 16. Still using a non-conductive shotgun stick, a lineman re-inserts the load pin and cotter pin for re-attaching the suspension insulator 16 to the conductor shoe 20. With the non-conductive shotgun stick, hydraulic jack 36 is then reversed and operated to lower conductor lifting bar 38 to separate fingers 38*b* from conductor 14, which is now again supported by suspension insulator 16. Using a shotgun stick, slider 30 is slid inwardly toward tower 10 until aperture 80 in web 33 is in registry with inboard board aperture 78*a*, at which time a lineman inserts a locking pin 82 through apertures 78*a* and 80 to lock the slider 30 in position near inboard end 22*a* of board 22.

This procedure is repeated for each suspension insulator 16 by removing board 22 and attached struts 28 from tower 10 using a helicopter and installing them below the next lower davit arm 12 which supports an insulator 16 to be removed and replaced. One useful time-saving technique is to initially mount bracket means 26 about six feet below each davit arm 12, commence insulator replacement on the uppermost davit arm utilizing the uppermost bracket means 26 to mount board 22 below the uppermost davit arm 12 and utilizing the next lower bracket means 26 for mounting the support struts 28 to tower 10. In this manner, when work is completed on the uppermost davit arm 12, the board 22 may be repositioned and mounted in the bracket means which last supported the support struts 28 and the next lower bracket means may be utilized for mounting the support struts 28 to tower 10. When work is to commence on the lowermost davit arm 12, the uppermost mounting bracket is removed from its position below the uppermost davit arm 12 and mounted on tower 10 at least 4 feet below the lowermost bracket means for mounting the support struts 28 to tower 10.

While the present invention has been described in terms of specific embodiments thereof, it will be understood that no limitations are intended to the details of construction or design other than as defined in the appended claims.

The invention claimed is:

1. Apparatus for replacing an electrical suspension insulator on a tower having davit arms which support suspension insulators and high voltage electrical conductors, said conductors being supported in conductor shoes attached to the lower ends of said suspension insulators, said apparatus comprising:

an elongate, non-conductive board having a planar upper surface and inner and outer ends, said inner end including means for mounting said board to said tower, said board including elongate side panels projecting above said planar upper surface for defining between said side panels and said planar upper surface of said board a generally U-shaped track, said board having a length at least one foot longer than the davit arm supporting the suspension insulator to be replaced;

elongate, non-conductive, length-adjustable strut means having inner and outer ends, said inner end including means for mounting said strut means to said tower with said outer ends of said strut means attached near the outer end of said board, said strut means adapted to be mounted to said tower below said board for providing diagonal bracing support for said board; and an elongate, non-conductive slider mounted in said generally U-shaped track track for movement between the inner and outer ends of said board, said slider including a planar surface parallel to said planar upper surface of said board and slider or roller means between said board upper surface and said slider planar surface for facilitating movement of said slider along said track, the planar upper surface of said board including jack means rigidly mounted thereon, said jack means including vertically reciprocally movable piston means, and conductor lifting means rigidly connected to said piston means for engaging said conductor.

2. Apparatus, as claimed in claim 1, wherein said elongate side panels include a portion near the outer end of said board which projects below said board, said portion including a series of longitudinally spaced apart apertures for pivotally attaching the outer ends of said strut means to said board.

3. Apparatus, as claimed in claim 1 wherein said elongate side panels comprise first elongate stiffener panels attached to the sides of said board and extending between the board's inner and outer ends.

4. Apparatus, as claimed in claim 3, wherein said side panels further include second elongate stiffener panels extending longitudinally along, attached to and projecting below said first stiffener panels, said second stiffener panels including a series of longitudinally spaced apart apertures near the outer end of said board for pivotally attaching the outer ends of said strut means to said board.

5. Apparatus, as claimed in claim 3, wherein said board comprises a pair of elongate flanges depending from opposite longitudinal sides of said board for defining a generally inverted U-shaped board cross-section, said first elongate stiffener panels being attached to said flanges.

6. Apparatus, as claimed in claim 3, wherein said first stiffener panels include transversely extending flanges projecting inwardly therefrom above said slider when said slider is mounted on said board for preventing said slider means from rising up off of said planar upper surface of said board.

7. Apparatus, as claimed in claim 1, wherein said outer end of said board includes stop means for preventing said slider from sliding off the outer end of said board.

8. Apparatus, as claimed in claim 7, wherein said stop means comprises a transversely extending elongate panel projecting above said planar surface of said board and attached to said board at its outer end.

9. Apparatus, as claimed in claim 1, wherein said board has a length between one and eight feet longer than the davit arm supporting the insulator to be replaced.

10. Apparatus, as claimed in claim 1, wherein said board includes elongate legs extending from its inner end toward said tower, said legs terminating in a transversely extending, elongate tubular element.

11. Apparatus, as claimed in claim 10, further comprising board-supporting bracket means for rigid mounting to a vertical support of said tower, said board-supporting bracket means including an elongate board mounting tray extending transversely of said board for receiving and retaining said tubular element therewithin.

12. Apparatus, as claimed in claim 11, wherein said elongate board mounting tray includes opposed end panels, said end panels each including an aperture therein, and a retaining rod extending through said apertures and said tubular element for pivotally mounting and retaining said legs within said mounting tray.

13. Apparatus, as claimed in claim 11, further comprising means for mounting said board mounting tray to said bracket means.

14. Apparatus, as claimed in claim 1, wherein said strut means comprises at least two elongate, non-conductive, length-adjustable struts having inner and outer ends, the outer ends of the at least two struts being pivotally mounted on opposite sides of and near the outer end of said board, the inner end of each strut terminating in a transversely extending, elongate tubular segment, the tubular segments at the inner ends of said struts being transversely spaced apart.

15. Apparatus, as claimed in claim 14, further comprising strut-supporting bracket means for rigid mounting to a vertical support of said tower, said strut-supporting bracket means including an elongate strut mounting tray extending transversely of said struts for receiving said tubular segments therewithin.

16. Apparatus, as claimed in claim 15, wherein said elongate strut mounting tray includes opposed end panels, said end panels each including an aperture therein, and a retaining rod extending through said apertures and said tubular segments for pivotally mounting and retaining said struts within said mounting tray.

17. Apparatus, as claimed in claim 15, further comprising means for mounting said strut mounting tray to said bracket means.

18. Apparatus, as claimed in claim 1, wherein said strut means comprises at least two elongate, non-conductive, length-adjustable struts having inner and outer ends, each said strut including a piston reciprocally operable within a hydraulic cylinder intermediate its ends for increasing or decreasing the length of said strut.

19. Apparatus, as claimed in claim 18, further comprising a hydraulic pump connected to each hydraulic cylinder via discharge and supply lines, each said hydraulic pump being mounted to said strut near said tower.

20. Apparatus, as claimed in claim 1, wherein said slider comprises a pair of elongate flanges upstanding from opposite longitudinal sides of said planar surface for defining a generally U-shaped slider cross-section.

21. Apparatus, as claimed in claim 20, wherein said slider flanges are longitudinally adjacent said elongate side panels when said slider is mounted in said track.

22. Apparatus, as claimed in claim 1, wherein said slider includes slider panels formed of low friction material attached to the underside of said planar surface.

23. Apparatus, as claimed in claim 1, wherein said conductor lifting means comprises an elongate bar having two spaced apart pairs of opposed, upwardly extending fingers for engaging said conductor.

24. Apparatus, as claimed in claim 23, wherein said opposed fingers of each pair are spaced apart in a direction perpendicular to the longitudinal extent of said bar and the upper ends of each finger are flared outwardly away from the other finger of the pair.

25. Apparatus, as claimed in claim 1, further comprising locking means for preventing slider movement along said board, said locking means comprising an aperture in the planar surface of said slider and at least one aperture in said planar surface of said board, side slider being movable along said board until the aperture in said slider aligns with an aperture in the board, and a locking pin extending through said aligned apertures to lock said slider in place on said board.

26. Apparatus for replacing an electrical suspension insulator on a tower having davit arms which support suspension insulators and high voltage electrical conductors, said conductors being supported in conductor shoes attached to the lower ends of said suspension insulators, said apparatus comprising:

an elongate, non-conductive board having a planar upper surface and inner and outer ends, said inner end including means for mounting said board to said tower, said board including elongate side panels projecting above said planar surface for defining between said side panels and said upper surface of said board a generally U-shaped track, said elongate side panels including a portion near the outer end of said board which projects below said board, said portion including a series of longitudinally spaced apart apertures, said board having a length between one foot and eight feet longer than the davit arm supporting the insulator to be replaced;

said board including elongate legs extending from its inner end toward said tower, said legs terminating in a transversely extending, elongate tubular element, said apparatus further comprising board-supporting bracket means for rigid mounting to a vertical support of said tower, said board-supporting bracket means including an elongate board mounting tray extending transversely of said board for receiving and retaining said tubular element therewithin;

elongate, non-conductive, length-adjustable strut means comprising at least two elongate, non-conductive length-adjustable struts having inner and outer ends, said outer ends of each of said at least two struts being pivotally mounted on opposite sides of and near the outer end of said board to one of said longitudinally spaced apart apertures, the inner end of each strut terminating in a transversely extending, elongate tubular segment, the tubular segments at the inner ends of said struts being transversely spaced apart, said strut means being mounted to said tower below said board for providing diagonal bracing support therefor;

said apparatus further comprising strut-supporting bracket means for rigid mounting to a vertical support of said tower below said board, said strut-supporting bracket means including an elongate strut mounting tray extending transversely of said struts for receiving said tubular segments therewithin; and an elongate, non-conductive slider mounted in said track for movement between inner and outer ends of said board, said board including stop means for preventing said slider from sliding off the outer end of said board, said slider including a planar surface parallel to said upper surface of said board and slider or roller means between said board upper surface and said slider planar surface for facilitating movement of said slider along said track, the planar upper surface of said board including jack means rigidly mounted thereon, said jack means including vertically reciprocally movable piston means, and conductor lifting means rigidly connected to said piston means for engaging said conductor.

27. Apparatus, as claimed in claim 26, wherein said conductor lifting means comprises an elongate bar having two spaced apart pairs of opposed, upwardly extending fingers for engaging said conductor.

28. Apparatus, as claimed in claim 27, wherein said opposed fingers of each pair are spaced apart in a direction perpendicular to the longitudinal extent of said bar and the upper ends of each finger are flared outwardly away from the other finger of the pair.

29. Apparatus, as claimed in claim 26, further comprising locking means for preventing slider movement along said board, said locking means comprising an aperture in the planar surface of said slider and at least one aperture in said planar surface of said board, side slider being movable along said board until the aperture in said slider aligns with an aperture in the board, and a locking pin extending through said aligned apertures to lock said slider in place on said board.

* * * * *